(12) United States Patent
Abe

(10) Patent No.: US 11,766,894 B2
(45) Date of Patent: Sep. 26, 2023

(54) NON-PNEUMATIC TIRE

(71) Applicant: BRIDGESTONE CORPORATION, Tokyo (JP)

(72) Inventor: Akihiko Abe, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 204 days.

(21) Appl. No.: 17/296,858

(22) PCT Filed: Nov. 13, 2019

(86) PCT No.: PCT/JP2019/044489
§ 371 (c)(1),
(2) Date: May 25, 2021

(87) PCT Pub. No.: WO2020/110722
PCT Pub. Date: Jun. 4, 2020

(65) Prior Publication Data
US 2022/0024252 A1  Jan. 27, 2022

(30) Foreign Application Priority Data

Nov. 30, 2018 (JP) .................................. 2018-224767

(51) Int. Cl.
*B60C 7/14* (2006.01)
*B60C 7/18* (2006.01)
*B60C 7/24* (2006.01)

(52) U.S. Cl.
CPC .............. *B60C 7/146* (2021.08); *B60C 7/143* (2013.01); *B60C 7/18* (2013.01); *B60C 7/24* (2013.01)

(58) Field of Classification Search
CPC ........... B60C 7/143; B60C 7/146; B60C 7/18; B60C 7/107
See application file for complete search history.

(56) References Cited

U.S. PATENT DOCUMENTS

2004/0069385 A1* 4/2004 Timoney ................... B60B 9/26
152/69
2006/0113016 A1* 6/2006 Cron ......................... B60C 7/18
152/11
(Continued)

FOREIGN PATENT DOCUMENTS

EP 0 399 383 A2 11/1990
JP 02-310102 A 12/1990
(Continued)

OTHER PUBLICATIONS

Extended European Search Report dated Jul. 8, 2022 in European Application No. 19889040.2.
(Continued)

*Primary Examiner* — Kip T Kotter
(74) *Attorney, Agent, or Firm* — Sughrue Mion, PLLC

(57) ABSTRACT

A pneumatic tire includes an inner cylinder, an outer cylinder, and a connecting member. The outer cylinder and the connecting member elastically deformable, and the thickness of the thickest part of the outer cylinder is thicker than the thickness of the thickest part of the connecting member. When the outer cylinder is pushed by a protrusion and deformed toward the inside in a tire radial direction, at least a part of the connecting member, which is positioned between the protrusion and the inner cylinder, and other connecting members adjacent to the connecting member in the tire circumferential direction abut each other. When the non-pneumatic tire is mounted on a vehicle and travels on a flat contact plane, a gap is secured between the connecting member positioned between the ground plane and the inner cylinder and other connecting members adjacent to the connecting member in the tire circumferential direction.

2 Claims, 5 Drawing Sheets

(56) References Cited

U.S. PATENT DOCUMENTS

| | | | |
|---|---|---|---|
| 2011/0079335 A1* | 4/2011 | Manesh | B60C 7/12 |
| | | | 152/310 |
| 2015/0283851 A1* | 10/2015 | Abe | B60C 7/24 |
| | | | 152/80 |
| 2016/0167434 A1 | 6/2016 | Nishida et al. | |
| 2017/0113490 A1 | 4/2017 | Iwamura et al. | |
| 2017/0136814 A1* | 5/2017 | Abe | B60B 9/04 |
| 2018/0029422 A1 | 2/2018 | Thompson | |
| 2018/0222254 A1 | 8/2018 | Abe | |
| 2019/0283495 A1 | 9/2019 | Nishida et al. | |

FOREIGN PATENT DOCUMENTS

| | | |
|---|---|---|
| JP | 2014-083915 A | 5/2014 |
| JP | 2014-189095 A | 10/2014 |
| JP | 2016-107751 A | 6/2016 |
| JP | 2017-081199 A | 5/2017 |
| JP | 2018-506464 A | 3/2018 |
| KR | 10-2018-0025728 A | 3/2018 |
| WO | 2007/137858 A2 | 12/2007 |
| WO | 2016/109702 A1 | 7/2016 |
| WO | 2017/061405 A1 | 4/2017 |
| WO | 2017/106723 A1 | 6/2017 |
| WO | 2018/067597 A1 | 4/2018 |
| WO | 2018/092635 A1 | 5/2018 |
| WO | 2018/211734 A1 | 11/2018 |

OTHER PUBLICATIONS

International Search Report of PCT/JP2019/044489 dated Jan. 28, 2020 [PCT/ISA/210].

* cited by examiner

NON-PNEUMATIC TIRE

CROSS REFERENCE TO RELATED APPLICATIONS

This application is a National Stage of International Application No. PCT/JP2019/044489, filed Nov. 13, 2019, claiming priority to Japanese Patent Application No. 2018-224767, filed Nov. 30, 2018, the contents of all of which are incorporated herein by reference in their entirety.

TECHNICAL FIELD

The present invention relates to a non-pneumatic tire.

BACKGROUND ART

Conventionally, there is known a non-pneumatic tire including an inner cylinder that is attached to an axle, an outer cylinder that surrounds the inner cylinder from an outside in a tire radial direction and has a tread member mounted on an outer peripheral surface thereof, and a plurality of connecting members that connect an outer peripheral surface of the inner cylinder and an inner peripheral surface of the outer cylinder and are arranged at intervals in a tire circumferential direction, in which the outer cylinder and the connecting members are formed to be elastically deformable.

As a non-pneumatic tire of this kind, for example, as shown in Patent Document 1, a configuration is known in which the connecting member is arranged with a buffer stopper protruding in the tire circumferential direction, and when the buffer stopper is mounted on a vehicle and travels on a flat ground plane, the buffer stopper abuts the other connecting member adjacent in the tire circumferential direction.

CITATION LIST

Patent Document

[Patent Document 1]
Japanese Unexamined Patent Application, First Publication No. H02-310102

SUMMARY OF INVENTION

Technical Problem

However, in the conventional non-pneumatic tire, when the buffer stopper is mounted on a vehicle and travels on a flat ground plane, the buffer stopper abuts other connecting members adjacent in the tire circumferential direction, so that the riding comfort may deteriorate.

The present invention has been made in view of the above-described circumstances, and an object of the present invention is to provide a non-pneumatic tire capable of suppressing a large deformation of an outer cylinder toward the inside in a tire radial direction, for example, when riding over a step such as a curb, without deteriorating the riding comfort.

Solution to Problem

A non-pneumatic tire according to an aspect of the present invention includes an inner cylinder that is attached to an axle, an outer cylinder that surrounds the inner cylinder from an outside in a tire radial direction and has a tread member mounted on an outer peripheral surface thereof, and a plurality of connecting members that connect an outer peripheral surface of the inner cylinder and an inner peripheral surface of the outer cylinder and are arranged at intervals in a tire circumferential direction, in which the outer cylinder and the connecting members are formed to be elastically deformable, a thickness of a thickest part of the outer cylinder is thicker than a thickness of a thickest part of the connecting member, when the outer cylinder is pushed by a protrusion and deformed toward an inside in the tire radial direction, at least a part of the connecting members positioned between the protrusion and the inner cylinder and other connecting members adjacent to the part of the connecting members in the tire circumferential direction abut each other, and when the non-pneumatic tire is mounted on a vehicle and travels on a flat ground plane, a gap is secured between the connecting members positioned between the ground plane and the inner cylinder and the other connecting members adjacent to the connecting members in the tire circumferential direction.

Advantageous Effects of Invention

According to the present invention, it is possible to suppress a large deformation of an outer cylinder toward the inside in a tire radial direction without deteriorating the riding comfort.

DESCRIPTION OF EMBODIMENTS

Hereinafter, configurations of the non-pneumatic tire according to the present embodiment will be described with reference to FIGS. 1 to 5.

Figure 1:
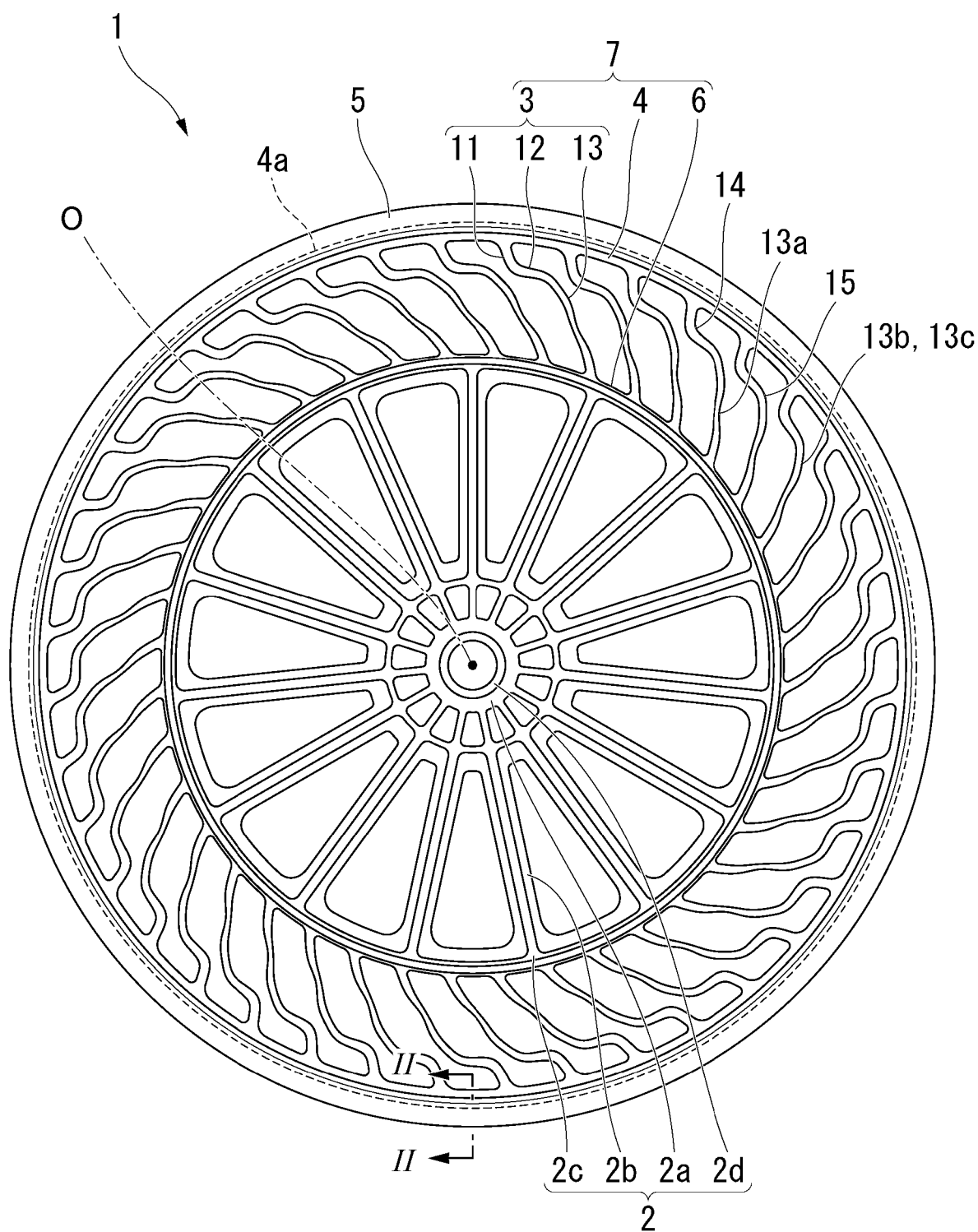
FIG. 1 is a side view of a non-pneumatic tire according to an embodiment of the present invention.

As shown in FIG. 1, the non-pneumatic tire 1 includes a wheel portion 2 attached to an axle, a tire portion 7 disposed on an outer periphery of the wheel portion 2, and a tread member 5 disposed on an outer periphery of the tire portion 7.

The non-pneumatic tire 1 of the present embodiment is used by being mounted on, for example, a bicycle, a two-wheeled vehicle, an automobile, a handle type electric wheelchair, or the like.

Here, the wheel portion 2 is formed in a disk shape, the tire portion 7 is formed in an annular shape, and each central axis is positioned on a common axis. The common axis is referred to as a central axis O, and a direction along the central axis O is called a tire width direction. In addition, when viewed from the tire width direction, a direction orbiting around the central axis O is referred to as a tire circumferential direction, and a direction intersecting the central axis O is referred to as a tire radial direction.

The center portion of each of the wheel portion 2, the tire portion 7, and the tread member 5 in the tire width direction coincide with each other. In a cross-sectional view along both directions in the tire width direction and the tire radial direction, the wheel portion 2, the tire portion 7, and the tread member 5 exhibit, as a whole, a line symmetrical shape with a straight line passing through the center portion (tire equator part) in the tire width direction as a reference.

The wheel portion 2 includes a cylindrical boss 2d extending in the tire width direction with the central axis O as a center, a mounting cylinder portion 2a fixed to an outer peripheral surface of the boss 2d, an exterior cylinder portion 2c surrounding the mounting cylinder portion 2a from an outside in the tire radial direction, and a plurality of ribs 2b connecting the mounting cylinder portion 2a and the exterior cylinder portion 2c to each other.

Each of the mounting cylinder portion 2a and the exterior cylinder portion 2c are disposed coaxially with the boss 2d. The plurality of ribs 2b are disposed at equal intervals in the tire circumferential direction, for example. Each of the plurality of ribs 2b extends radially with the boss 2d as a center.

In the present embodiment, the mounting cylinder portion 2a, the plurality of ribs 2b, and the exterior cylinder portion 2c are integrally formed of a thermoplastic resin. As a result, the wheel portion 2 can be formed by insert molding using the boss 2d as an insert product, and is suitable for mass production.

Each of the boss 2d, the mounting cylinder portion 2a, the plurality of ribs 2b, and the exterior cylinder portion 2c may be separately formed. In addition, the mounting cylinder portion 2a, the plurality of ribs 2b, and the exterior cylinder portion 2c may be formed of a material other than the thermoplastic resin.

The tire portion 7 includes an inner cylinder 6 that is externally fitted to the exterior cylinder portion 2c of the wheel portion 2, an outer cylinder 4 that surrounds the inner cylinder 6 from the outside in the tire radial direction and has a tread member 5 mounted on an outer peripheral surface thereof, and a plurality of connecting members 3 that connect the outer peripheral surface of the inner cylinder 6 and the inner peripheral surface of the outer cylinder 4 and are arranged at intervals in the tire circumferential direction. The elastic modulus of a material forming the tire portion 7 is, for example, 300 MPa or more and 1500 MPa or less.

The inner cylinder 6 is attached to the axle via the wheel portion 2. The central axes of the inner cylinder 6 and the outer cylinder 4 are disposed coaxially with the central axis O. The center portion in the tire width direction of each of the inner cylinder 6, the connecting member 3, and the outer cylinder 4 is disposed in coincidence with each other.

In the present embodiment, the inner cylinder 6, the connecting member 3, and the outer cylinder 4 are integrally formed of the thermoplastic resin. As a result, the tire portion 7 can be formed by injection molding and is suitable for mass production. The thermoplastic resin may be, for example, only one kind of resin or a mixture containing two or more kinds of resins, or a mixture containing one or more kinds of resins and one or more kinds of elastomers, and may further include, for example, additives such as anti-aging agents, plasticizers, fillers, or pigments.

The inner cylinder 6, the connecting members 3, and the outer cylinder 4 may be separately formed. The inner cylinder 6, the connecting members 3, and the outer cylinder 4 may be formed of a material other than the thermoplastic resin.

The tire portion 7 and the wheel portion 2 may be integrally formed or may be separately formed. The wheel portion 2 has a function of connecting the axle and the tire portion 7, and the tire portion 7 has a function of absorbing vibration transmitted from the ground to the axle. As described above, since the wheel portion 2 and the tire portion 7 have different functions, they may be formed of different materials. For example, the tire portion 7 is formed of a material having a relatively small elastic modulus to secure vibration absorption performance, and the wheel portion 2 may be formed of a material having a larger elastic modulus than the tire portion 7 to secure robustness. In addition, for example, the wheel portion 2 may be formed of a material having a relatively small specific gravity to reduce the weight of the whole non-pneumatic tire 1.

Figure 2:
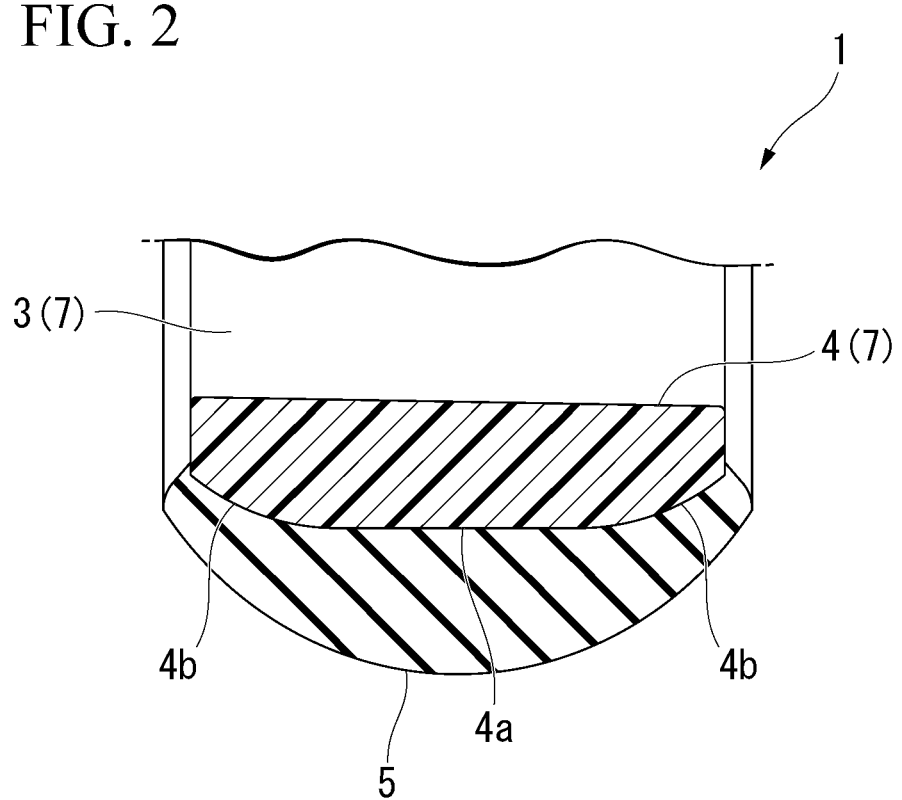
FIG. 2 is a cross-sectional view taken along a line 11-11 of the non-pneumatic tire of FIG. 1.

The tread member 5 is formed in a tubular shape extending in the tire width direction with the central axis O as a center. The tread member 5 is externally fitted to the outer cylinder 4 formed to be elastically deformable. As shown in FIG. 2, the tread member 5 covers not only the outer peripheral surface of the outer cylinder 4 but also an outer end portion in the tire radial direction of the outer cylinder 4 of side surfaces of the outer cylinder 4 facing the tire width direction. The elastic modulus of the material forming the tread member 5 is smaller than the elastic modulus of the material forming the tire portion 7. As shown in FIG. 2, the outer peripheral surface of the tread member 5 exhibits a curved shape which protrudes toward the outside in the tire radial direction in the cross-sectional view taken along a line II-II in FIG. 1, that is, in the longitudinal sectional view along both directions of the tire width direction and the tire radial direction.

The tread member 5 is formed of, for example, natural rubber and/or vulcanized rubber obtained by vulcanizing a rubber composition, a thermoplastic material, or the like. From the viewpoint of wear resistance, it is preferable to form the tread member 5 with the vulcanized rubber. Examples of the thermoplastic material include a thermoplastic elastomer and a thermoplastic resin.

Examples of the thermoplastic elastomer include an amide thermoplastic elastomer (TPA), an ester thermoplastic elastomer (TPC), an olefin thermoplastic elastomer (TPO), a styrene thermoplastic elastomer (TPS), a urethane thermoplastic elastomer (TPU), a thermoplastic rubber cross-linked body (TPV), or other thermoplastic elastomer (TPZ) as defined in JIS K 6418.

Examples of the thermoplastic resin include a urethane resin, an olefin resin, a vinyl chloride resin, a polyamide resin, and the like.

Figure 3:
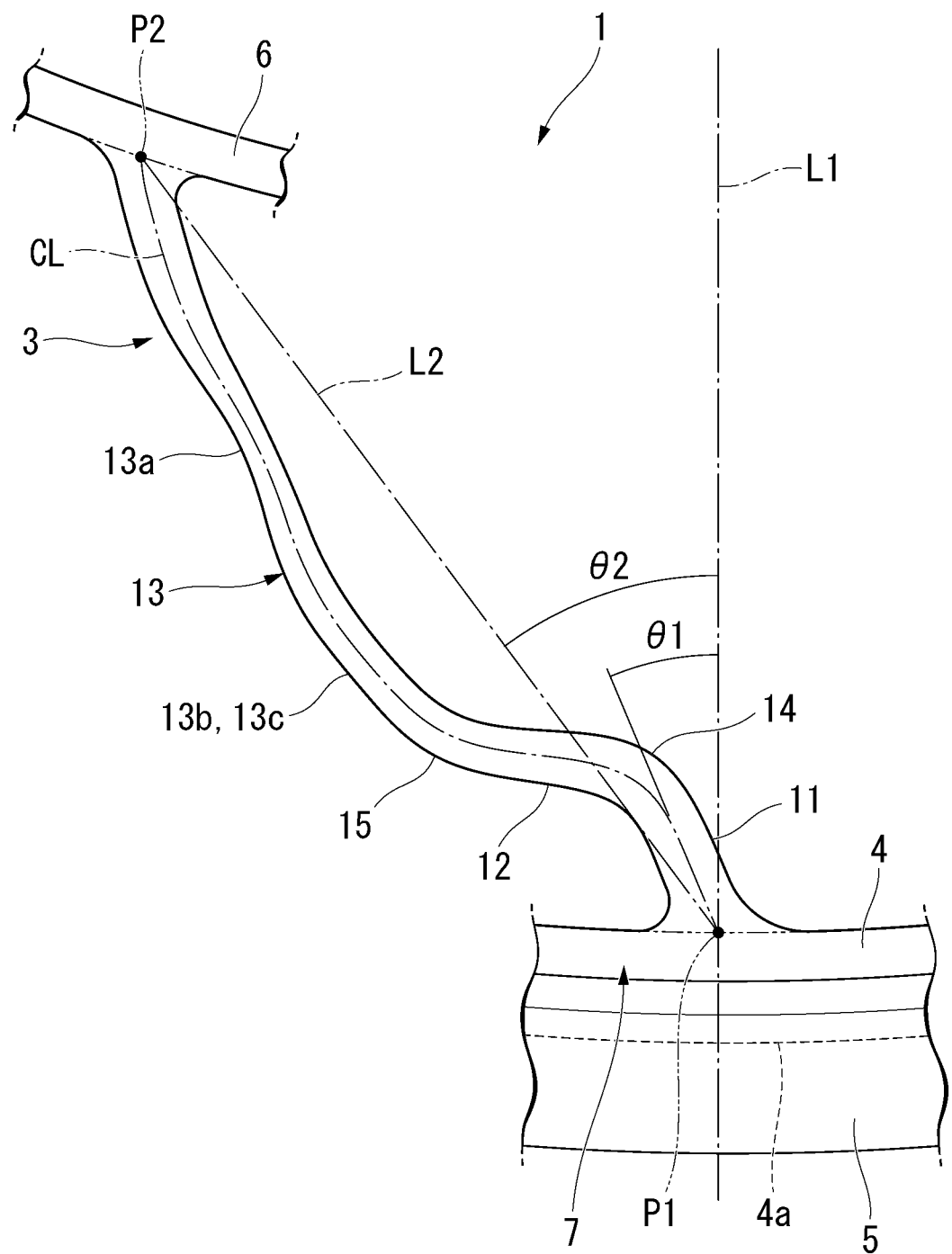
FIG. 3 is an enlarged view of the connecting member shown in FIG. 1.

As shown in FIGS. 1 and 3, the connecting member 3 is formed in a rectangular plate shape that is curved as a whole, and the front and back surfaces face the tire circumferential direction or the tire radial direction, and the side surfaces face the tire width direction. The connecting member 3 is formed of a material that is capable of elastic deformation, and connects the outer peripheral surface of the inner cylinder 6 and the inner peripheral surface of the outer cylinder 4 so as to be relatively elastically displaceable. A plurality of connecting members 3 are disposed at equal intervals in the tire circumferential direction.

The connecting member 3 includes a vertical base portion 11, a horizontal base portion 12, and an inclined portion 13.

The vertical base portion 11 extends toward the inside in the tire radial direction from the inner peripheral surface of the outer cylinder 4. The front and back surfaces of the vertical base portion 11 face the tire circumferential direction. The whole front and back surfaces of the vertical base portion 11 except for the connection part with the outer cylinder 4 extend linearly in the side view from the tire width direction. In the side view, the front and back surfaces of the vertical base portions 11 at the connection part with the outer cylinder 4 gradually extend in a direction apart from each other toward the outside in the tire radial direction, and exhibit a curved shape recessed in the tire circumferential direction.

When viewed from the tire width direction, the central line CL of the vertical base portion 11 is slightly inclined toward one side in the tire circumferential direction with respect to a straight line L1 passing through the central axis O and an outer end edge P1 in the tire radial direction of a central line CL passing through the center portion in the thickness direction of the vertical base portion 11. An inclination angle θ1 is, for example, 25° or less.

The central line CL of the vertical base portion 11 may coincide with the straight line L1.

The thickness of the vertical base portion 11 in the tire circumferential direction is the same over an entire length in the tire radial direction except for the connection part with the outer cylinder 4. The thickness of the vertical base portion 11 is thickest in the connecting member 3.

Here, the thickness of the vertical base portion 11 means the thickness of a part of the vertical base portions 11 which is positioned inside in the tire radial direction from a connection part with the outer cylinder 4 and has the front and back surfaces extending linearly in a side view viewed from the tire width direction. For example, when the thickness of the part differs depending on a position in the tire radial direction, it means the average value of the thickness.

The horizontal base portion 12 extends from the inner end portion in the tire radial direction of the vertical base portion 11 toward one side in the tire circumferential direction along the tire circumferential direction. The front and back surfaces of the horizontal base portion 12 face in the tire radial direction. The horizontal base portion 12 extends linearly in a side view seen from the tire width direction. In the horizontal base portion 12, when viewed from the tire width direction, at least one of the central line CL passing through the center portion in the thickness direction, a surface facing inside in the tire radial direction, and a surface facing outside in the tire radial direction extend along the tire circumferential direction. In the shown example, in the front and back surfaces of the horizontal base portion 12, the surface facing inside in the tire radial direction extends along the tire circumferential direction, and the surface facing outside in the tire radial direction gradually extends toward the inside in the tire radial direction toward one side in the tire circumferential direction. The thickness of the horizontal base portion 12 in the tire radial direction gradually decreases from the other side in the tire circumferential direction toward one side. The length of the horizontal base portion 12 is the same as the length of the vertical base portion 11.

The connection part (hereinafter, referred to as the first connection part) 14 between the horizontal base portion 12 and the vertical base portion 11 is curved so as to protrude toward the other side in the tire circumferential direction.

The inclined portion 13 gradually extends toward one side in the tire circumferential direction from an end portion on one side in the tire circumferential direction of the horizontal base portion 12 toward the inside in the tire radial direction, and is connected to the outer peripheral surface of the inner cylinder 6.

The connection part (hereinafter, referred to as the second connection part) 15 between the inclined portion 13 and the horizontal base portion 12 is curved so as to protrude toward the one side in the tire circumferential direction. The radius of curvature of the second connection part 15 is larger than the radius of curvature of the first connection part 14 when viewed from the tire width direction.

When viewed from the tire width direction, an inclination angle θ2 toward one side in the tire circumferential direction with respect to the straight line L1 of a straight line L2 connecting an inner end edge P2 in the tire radial direction of the central line CL passing through a center portion in the thickness direction of the inclined portion 13 and the outer end edge P1 in the tire radial direction of the central line CL passing through a center portion in the thickness direction of the vertical base portion 11 is larger than the inclination angle θ1 and is 32° or more and 45° or less.

When viewed from the tire width direction, the whole of the central line CL of the vertical base portion 11 except for the outer end edge P1 in the tire radial direction is positioned on the other side in the tire circumferential direction from the straight line L2, and the whole of the central line CL of the inclined portion 13 except for the inner end edge P2 in the tire radial direction is positioned on one side in the tire circumferential direction from the straight line L2.

When viewed from the tire width direction, the length of the inclined portion 13 is longer than the lengths of the vertical base portion 11 and the horizontal base portion 12. When viewed from the tire width direction, the length of the inclined portion 13 is, for example, about three times the length of each of the vertical base portion 11 and the horizontal base portion 12.

Figure 4:
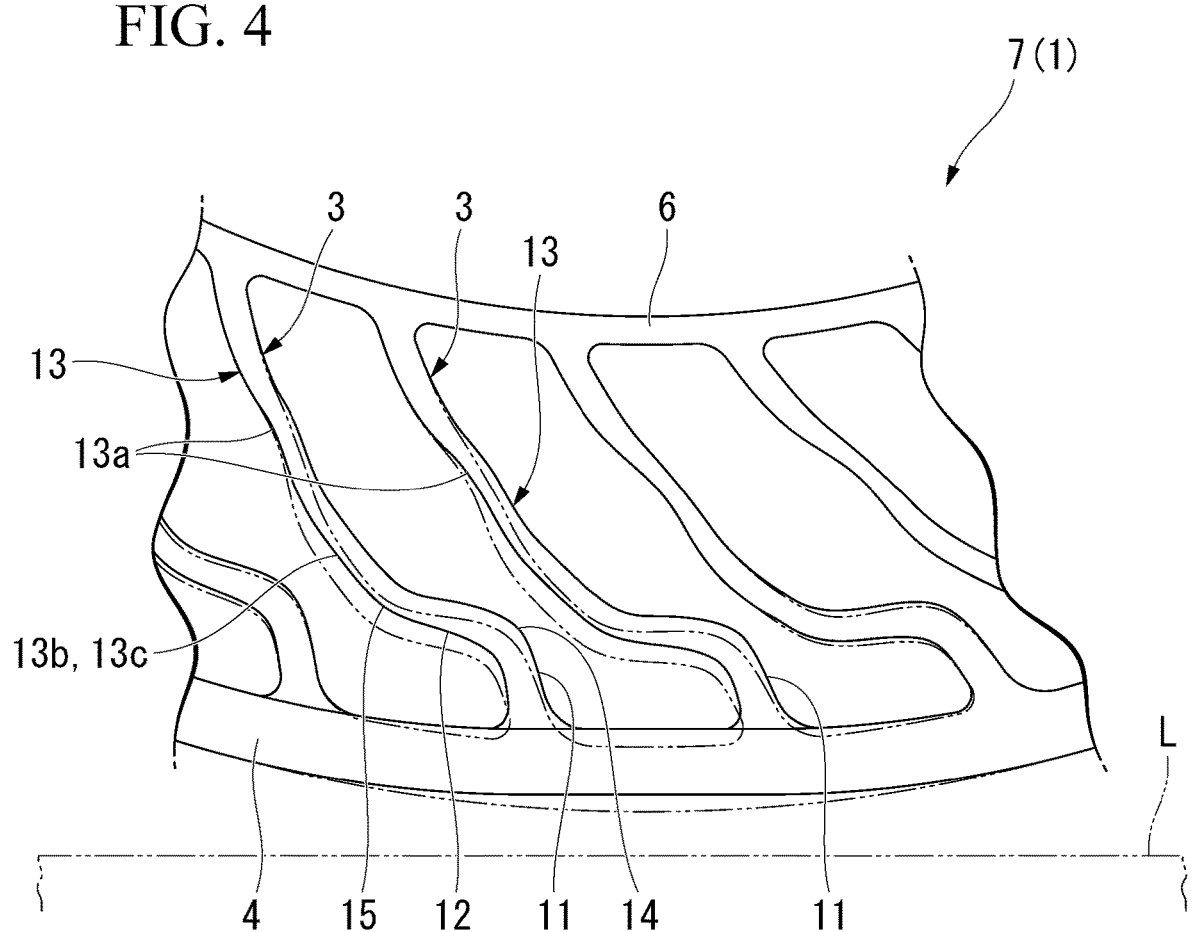
FIG. 4 is an enlarged side view showing a state in which the non-pneumatic tire shown in FIGS. 1 to 3 is grounded to a flat ground plane.

The thickness of the inclined portion 13 is thinner than the thickness of each of the vertical base portion 11 and the horizontal base portion 12. As shown in FIG. 4, when the non-pneumatic tire 1 is grounded to the ground plane L, in the inclined portion 13 of the connecting member 3 where the vertical base portion 11 is positioned between the ground plane L and the inner cylinder 6, the thickness of a part (hereinafter referred to as minimum stress part) 13a in which the minimum stress is generated, is thinner than the thickness of the other parts. The minimum stress part 13a is curved so as to protrude toward the other side in the tire circumferential direction. The minimum stress part 13a is positioned in a central region of the inclined portion 13 in the tire radial direction. In the shown example, the minimum stress part 13a is positioned inside in the tire radial direction from the center portion in the tire radial direction between the inner cylinder 6 and the outer cylinder 4. When the non-pneumatic tire 1 is grounded to the ground plane L, the stress generated in the minimum stress part 13a as described above becomes the minimum in the connecting member 3.

In the inclined portion 13, a surface (hereinafter referred to as an abutment surface) 13b facing one side in the tire circumferential direction in the outer part 13c positioned outside the central region in the tire radial direction is gradually extended linearly toward one side in the tire circumferential direction from the outside toward the inside in the tire radial direction when viewed from the tire width direction. At least the outer part 13c in the tire radial direction of the inclined portions 13 is positioned outside in the tire radial direction from the center portion in the tire radial direction between the inner cylinder 6 and the outer cylinder 4.

When viewed from the tire width direction, a center portion of the abutment surface 13b of the inclined portion 13 in the other connecting member 3 positioned on the other side in the tire circumferential direction among the connecting members 3 adjacent in the tire circumferential direction, and a top portion of the first connection part 14 in the one connecting member 3 positioned on one side in the tire circumferential direction face each other in a direction orthogonal to the abutment surface 13b. A gap between the connecting members 3 adjacent in the tire circumferential direction is minimized between the center portion of the abutment surface 13b of the inclined portion 13 of the other connecting member 3 and the top portion of the first connection part 14 of the one connecting member 3.

When viewed from the tire width direction, the gap between the vertical base portions 11 adjacent in the tire circumferential direction is wider than the gap between the inclined portions 13 adjacent in the tire circumferential direction.

As shown in FIG. 2, in the cross-sectional view along both directions of the tire width direction and the tire radial direction, in the outer peripheral surface of the outer cylinder 4, the center portion 4a in the tire width direction extends straight in the tire width direction, and both end portions 4b in the tire width direction extend gradually toward the inside in the tire radial direction toward the outside in the tire width direction. The thickest part of the outer cylinder 4 is the center portion 4a in the tire width direction.

The thickness of the center portion 4a of the outer cylinder 4 in the tire width direction is thicker than the thickness of the vertical base portion 11 which has the thickest thickness in the connecting member 3. The thickness of the center portion 4a of the outer cylinder 4 in the tire width direction is 1.1 to 3.0 times the thickness of the vertical base portion 11.

Figure 5:
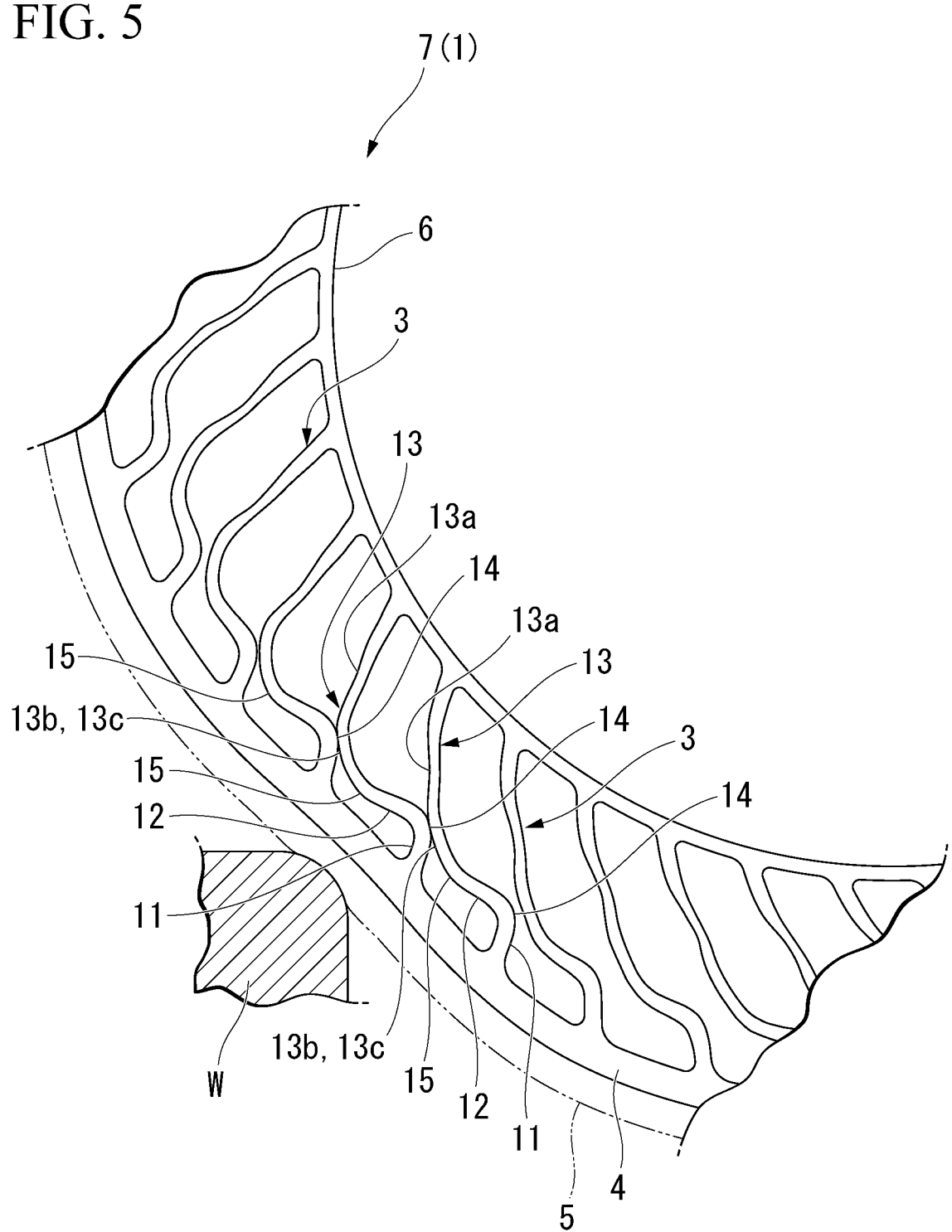
FIG. 5 is an enlarged side view showing a state in which the outer cylinder is deformed toward an inside in the tire radial direction such that an inner peripheral surface of the outer cylinder bulges toward the inside in the tire radial direction, in the non-pneumatic tires shown in FIGS. 1 to 3.

In the present embodiment, as shown in FIG. 5, the connecting member 3 positioned between the protrusion W and the inner cylinder 6 and the other connecting member 3 adjacent to the connecting member 3 in the tire circumferential direction abut each other when the outer cylinder 4 is pushed by the protrusion W and deformed toward the inside in the tire radial direction (back ring deformation), that is, when the outer peripheral surface of the outer cylinder 4 is recessed toward the inside in the tire radial direction and the inner peripheral surface of the outer cylinder 4 bulges toward the inside in the tire radial direction (hereinafter referred to as "when riding over a step").

In the shown example, when riding over a step, the first connection part 14 of the connecting member 3 positioned on one side in the tire circumferential direction among the connecting member 3 positioned between the protrusion W and the inner cylinder 6 and the other connecting members 3 adjacent to the connecting member 3 in the tire circumferential direction, and the abutment surface 13b of the outer part 13c in the tire radial direction of the inclined portion 13 of the connecting member 3 positioned on the other side in the tire circumferential direction abut each other.

Among the outer parts 13c of the connecting member 3, at least a part that abuts the first connection part 14 of the other connecting member 3 when riding over a step is positioned outside in the tire radial direction from the center portion in the tire radial direction between the inner cylinder 6 and the outer cylinder 4.

In the shown example, when riding over a step, the inner end portion in the tire radial direction of the outer part 13c of the connecting member 3 positioned on the other side in the tire circumferential direction and the top portion of the first connection part 14 of the connecting member 3 positioned on the one side in the tire circumferential direction abut each other.

When riding over a step, a part except for the inner end portion in the tire radial direction of the outer part 13c of the connecting member 3 positioned on the other side in the tire circumferential direction and a part except for the top portion of the first connection part 14 of the connecting member 3 positioned on the one side in the tire circumferential direction may abut each other.

In the present embodiment, the whole of the outer part 13c of the connecting member 3 is positioned outside in the tire radial direction from the center portion in the tire radial direction between the inner cylinder 6 and the outer cylinder 4.

In the outer part 13c of the connecting member 3, for example, only the outer end portion in the tire radial direction may be positioned outside in the tire radial direction from the center portion in the tire radial direction between the inner cylinder 6 and the outer cylinder 4, or the whole of the outer part 13c of the connecting member 3 may be positioned inside in the tire radial direction from the center portion in the tire radial direction between the inner cylinder 6 and the outer cylinder 4.

As shown in FIG. 4, when the non-pneumatic tire 1 is mounted on a vehicle and travels on the flat ground plane L, the gap is secured between the connecting member 3 positioned between the ground plane L and the inner cylinder 6 and the other connecting member 3 adjacent to the connecting member 3 in the tire circumferential direction.

As described above, with the non-pneumatic tire 1 according to the present embodiment, since the thickness of the center portion 4a in the tire width direction, which has the thickest thickness of the outer cylinder 4, is larger than the thickness of the vertical base portion 11, which has the thickest thickness of the connecting member 3, the rigidity of the outer cylinder 4 can be secured, and when the non-pneumatic tire 1 rides over a step such as a curb, the large deformation of the outer cylinder 4 toward the inside in the tire radial direction can be suppressed.

Since at least a part of the connecting member 3 positioned between the protrusion W and the inner cylinder 6 and the other connecting members 3 adjacent to the connecting member 3 in the tire circumferential direction abut each other when riding over a step as shown in FIG. 5, further deformation can be restrained, and large deformation of the outer cylinder 4 toward the inside in the tire radial direction can be reliably suppressed.

On the other hand, when the non-pneumatic tire 1 is mounted on a vehicle and travels on the flat ground plane L, the gap between the connecting member 3 positioned between the ground plane L and the inner cylinder 6 and the other connecting members 3 adjacent to the connecting member 3 in the tire circumferential direction is secured, so that at least a part of the connecting member 3 positioned between the protrusion W and the inner cylinder 6 and the other connecting members 3 adjacent to the connecting member 3 in the tire circumferential direction can be abutted each other only when riding over a step, thereby preventing deterioration of riding comfort when traveling on the flat ground plane L.

In the present embodiment, when riding over a step, the first connection part 14 of the connecting member 3 positioned on one side in the tire circumferential direction among the connecting member 3 positioned between the protrusion W and the inner cylinder 6 and the other connecting members 3 adjacent to the connecting member 3 in the tire circumferential direction, and the outer part 13c in the tire radial direction of the inclined portion 13 of the connecting member 3 positioned on the other side in the tire circumferential direction abut each other.

Accordingly, when the outer cylinder 4 is deformed toward the inside in the tire radial direction as described above, a part that abuts each other between the connecting members 3 adjacent in the tire circumferential direction is defined at a specific portion, so that the large deformation of the outer cylinder 4 toward the inside in the tire radial direction can be reliably suppressed.

Since the horizontal base portion 12 extends along the tire circumferential direction, when the outer cylinder 4 is deformed toward the inside in the tire radial direction as described above, the outer part 13c in the tire radial direction of the inclined portion 13 can easily be deflected and deformed toward one side in the tire circumferential direction, and the outer part 13c can be reliably abutted on the other connecting member 3 adjacent to the connecting member 3 on one side in the tire circumferential direction when riding over a step.

In the present embodiment, in the outer part 13c in the tire radial direction of the inclined portion 13, at least a part that abuts the first connection part 14 of the other connecting member 3 when riding over a step is positioned outside in the tire radial direction from the center portion in the tire radial direction between the inner cylinder 6 and the outer cylinder 4. In other words, when riding over a step, a part that abuts each other in the connecting member 3 positioned between the protrusion W and the inner cylinder 6 and each of the other connecting members 3 adjacent to the connecting member 3 in the tire circumferential direction are positioned closer to the outside in the tire radial direction between the inner cylinder 6 and the outer cylinder 4, and the connecting members 3 adjacent in the tire circumferential direction can be abutted each other at an early stage when the inner peripheral surface of the outer cylinder 4 bulges toward the inside in the tire radial direction. As a result, it is possible to more reliably suppress a large deformation of the outer cylinder 4 toward the inside in the tire radial direction.

Since the inclined portion 13 having the thickness thinner than the thicknesses of each of the vertical base portion 11 and the horizontal base portion 12 reaches the outside in the tire radial direction than the center portion in the tire radial direction between the inner cylinder 6 and the outer cylinder 4 and the ratio of the length of the inclined portion 13 occupied to the connecting member 3 is increased, a bending rigidity of the inclined portion 13 is reliably reduced, the connecting member 3 can be easily elastically deformed, and the riding comfort when traveling on the flat ground plane L can be secured.

Moreover, since the inclined portion 13 is arranged at a position where the outer end portion in the tire radial direction where the stress is most concentrated when the non-pneumatic tire 1 is grounded is avoided in the connecting member 3, the deterioration of durability can be prevented.

Since the inclination angle θ2 is 32° or more and 45° or less, it is possible to reliably suppress the deterioration of riding comfort while suppressing the increase in weight.

When the inclination angle θ2 is less than 32°, the connecting member 3 cannot be easily elastically deformed when the non-pneumatic tire 1 is grounded, and when the inclination angle θ2 is more than 45°, the connecting member 3 becomes too long to be excessively elastically deformed and the weight also increases.

The technical scope of the present invention is not limited to the above-described embodiment, and various modifications can be made without departing from the scope of the present invention.

In the above embodiment, a configuration in which the non-pneumatic tire 1 includes the wheel portion 2 and the tread member 5 is shown, but a configuration in which the non-pneumatic tire 1 may be configured to include only the tire portion 7 without the wheel portion 2 and the tread member 5 may be employed.

In the embodiment described above, a configuration in which the thickness of the minimum stress part 13a of the inclined portions 13 is thinner than the thickness of the other parts is shown, but the present invention is not limited to this, and the thickness of the whole inclined portion 13 including the minimum stress part 13a may be suitably changed to be equal, for example.

In the above embodiment, the minimum stress part 13a is curved so as to protrude toward the other side in the tire circumferential direction, but the present invention is not limited to this, and it may be curved so as to protrude toward one side in the tire circumferential direction, or it may be appropriately changed such that the minimum stress portion is not curved but is simply recessed in the tire circumferential direction.

In the above embodiment, a configuration in which the thickest part of the outer cylinder 4 is the center portion 4a in the tire width direction is shown, but the present invention is not limited to this, and may be suitably changed, for example, to the end portion 4b in the tire width direction.

In the above embodiment, the thickness of the vertical base portion 11 is made to be thickest in the connecting member 3, but instead, for example, the thickness of the horizontal base portion 12, the first connection part 14, or the second connection part 15 may be made to be thickest in the connecting member 3.

In the above embodiment, a configuration in which the abutment surface 13b of the outer part 13c in the tire radial direction of the inclined portion 13 is gradually extended linearly toward one side in the tire circumferential direction from the outside toward the inside in the tire radial direction, as viewed from the tire width direction, is shown, but the present invention is not limited to this, and for example, the abutment surface 13b may be formed in a curved shape which protrudes toward one side in the tire circumferential direction, when viewed from the tire width direction, or in a curved shape which is recessed toward the other side in the tire circumferential direction.

Among them, when the abutment surface 13b is formed in the curved shape which is recessed toward the other side in the tire circumferential direction, when viewed from the tire width direction, a gap between the abutment surface 13b and the first connection part 14 of the connecting member 3 positioned on the one side in the tire circumferential direction can be easily secured when the non-pneumatic tire 1 is mounted on a vehicle and travels on the flat ground plane L. On the other hand, when riding over a step as shown in FIG. 5, the top portion of the first connection part 14 of the connecting member 3 positioned on the one side in the tire circumferential direction is locked to the abutment surface 13b, and the large deformation of the outer cylinder 4 toward the inside in the tire radial direction can be reliably suppressed.

The aspect of the connecting member 3 is not limited to the shown example, and other configurations may be adopted as long as a gap is provided between the connecting member 3 positioned between the ground plane L and the inner cylinder 6 and the other connecting members 3 adjacent to the connecting member 3 in the tire circumferential direction in a state where the non-pneumatic tire 1 is grounded to the flat ground plane L, and at least a part of the connecting member 3 positioned between the protrusion W and the inner cylinder 6 and other connecting members 3 adjacent to the connecting member 3 in the tire circumferential direction abut each other when riding over a step.

For example, a configuration in which a disk-shaped connecting member between the inner cylinder 6 and the outer cylinder 4 is fleshed out in a honeycomb shape, a configuration in which a plate-shaped connecting member is radially disposed with axle as a center, and a configuration in which radial connecting members are connected to each other by an intermediate member may be adopted.

In addition, it is possible to replace the components in the above-described embodiment with known components without departing from the scope of the present invention, and the above-described modification examples may be combined appropriately.

According to the present invention, since the thickness of the thickest part of the outer cylinder is thicker than the thickness of the thickest part of the connecting member, the rigidity of the outer cylinder can be secured, and when the non-pneumatic tire rides over a step such as a curb, the large deformation of the outer cylinder toward the inside in the tire radial direction can be suppressed.

When the outer cylinder is pushed by the protrusion and deformed toward the inside in the tire radial direction (back ring deformation), that is, when the outer peripheral surface of the outer cylinder is recessed toward the inside in the tire radial direction and the inner peripheral surface of the outer cylinder bulges toward the inside in the tire radial direction (hereinafter referred to as "when riding over a step"), since at least a part of the connecting member positioned between the protrusion and the inner cylinder and the other connecting members adjacent to the connecting member in the tire circumferential direction abut each other, further deformation can be suppressed, and large deformation of the outer cylinder toward the inside in the tire radial direction can be reliably suppressed.

On the other hand, when the non-pneumatic tire is mounted on a vehicle and travels on the flat ground plane, the gap between the connecting member positioned between the ground plane L and the inner cylinder and the other connecting members adjacent to the connecting member in the tire circumferential direction is secured, so that at least a part of the connecting member positioned between the protrusion W and the inner cylinder and the other connecting members adjacent to the connecting member in the tire circumferential direction can be abutted each other only when riding over a step, thereby preventing deterioration of riding comfort when traveling on the flat ground plane.

Here, the connecting member may include a vertical base portion that extends toward the inside in the tire radial direction from the inner peripheral surface of the outer cylinder, a horizontal base portion that extends along the tire circumferential direction from an inner end portion in the tire radial direction of the vertical base portion toward one side in the tire circumferential direction, and an inclined portion that gradually extends toward one side in the tire circumferential direction from an end portion on one side in the tire circumferential direction of the horizontal base portion toward the inside in the tire radial direction, and when the outer cylinder is pushed by a protrusion, and at least a part of the connecting member positioned between the protrusion and the inner cylinder and other connecting members adjacent to the connecting member in the tire circumferential direction abut each other, among the connecting members, a connection part between the vertical base portion and the horizontal base portion of the connecting member positioned on one side in the tire circumferential direction and an outer part of the inclined portion in the tire radial direction of the connecting member positioned on the other side in the tire circumferential direction may abut each other.

In this case, when riding over a step, the connection part between the vertical base portion and the horizontal base portion in the connecting member positioned on one side in the tire circumferential direction among the connecting member positioned between the protrusion and the inner cylinder and the other connecting members adjacent to the connecting member in the tire circumferential direction, and the outer part in the tire radial direction of the inclined portion of the connecting member positioned on the other side in the tire circumferential direction abut each other.

Accordingly, when the outer cylinder is deformed toward the inside in the tire radial direction as described above, a part that abuts each other between the connecting members adjacent in the tire circumferential direction is defined at a specific portion, so that the large deformation of the outer cylinder toward the inside in the tire radial direction can be reliably suppressed.

Since the horizontal base portion extends along the tire circumferential direction, when the outer cylinder is deformed toward the inside in the tire radial direction as described above, the outer part in the tire radial direction of the inclined portion can easily be deflected and deformed toward one side in the tire circumferential direction, and the outer part can be reliably abutted on the other connecting member adjacent to the connecting member on one side in the tire circumferential direction when riding over a step.

In addition, the thickness of the inclined portion may be thinner than the thicknesses of each of the vertical base portion and the horizontal base portion, and in the outer part of the inclined portion in the tire radial direction, at least a part that abuts the connection part of the other connecting member may be positioned outside in the tire radial direction from a center portion in the tire radial direction between the inner cylinder and the outer cylinder when the outer cylinder is deformed toward the inside in the tire radial direction such that the inner peripheral surface of the outer cylinder bulges toward the inside in the tire radial direction.

In this case, in the outer part of the inclined portion in the tire radial direction, at least a part that abuts the connection part of the other connecting member when riding over a step is positioned outside in the tire radial direction from the center portion in the tire radial direction between the inner cylinder and the outer cylinder. In other words, when riding over a step, each part that abuts each other in the connecting member positioned between the protrusion and the inner cylinder and other connecting members adjacent to the connecting member in the tire circumferential direction are positioned closer to the outside in the tire radial direction between the inner cylinder and the outer cylinder, and the connecting members adjacent in the tire circumferential direction can be abutted each other at an early stage when the inner peripheral surface of the outer cylinder bulges toward the inside in the tire radial direction. As a result, it is possible to more reliably suppress a large deformation of the outer cylinder toward the inside in the tire radial direction.

Since the inclined portion having the thickness thinner than the thicknesses of each of the vertical base portion and the horizontal base portion reaches the outside in the tire radial direction than the center portion in the tire radial direction between the inner cylinder and the outer cylinder and the ratio of the length of the inclined portion occupied to the connecting member is increased, a bending rigidity of the inclined portion is reliably reduced, the connecting member can be easily elastically deformed, and the riding comfort when traveling on the flat ground plane can be secured.

Moreover, since the inclined portion is arranged at a position where the outer end portion in the tire radial direction where the stress is most concentrated when the non-pneumatic tire is grounded is avoided in the connecting member, the deterioration of durability can be prevented.

INDUSTRIAL APPLICABILITY

By applying the non-pneumatic tire of the present invention to the field, it is possible to suppress a large deformation of an outer cylinder toward the inside in a tire radial direction without deteriorating the riding comfort.

REFERENCE SIGNS LIST

1: Non-pneumatic tire
3: Connecting member
4: Outer cylinder
5: Tread member
6: Inner cylinder
11: Vertical base portion
12: Horizontal base portion
13: Inclined portion
13c: Outer part
14: First connection part (connection part)
L: Ground plane
W: Protrusion

The invention claimed is:

1. A non-pneumatic tire comprising:
an inner cylinder that is configured to be used with an axle;
an outer cylinder that surrounds the inner cylinder from an outside in a tire radial direction and has a tread member mounted on an outer peripheral surface thereof; and
a plurality of connecting members that connect an outer peripheral surface of the inner cylinder and an inner peripheral surface of the outer cylinder and are arranged at intervals in a tire circumferential direction, wherein
the outer cylinder and the connecting members are formed to be elastically deformable,
a thickness of a thickest part of the outer cylinder is thicker than a thickness of a thickest part of the connecting member,
when the outer cylinder is pushed by a protrusion and deformed toward an inside in the tire radial direction, at least a part of the connecting member positioned between the protrusion and the inner cylinder and other connecting members adjacent to the connecting member in the tire circumferential direction abut each other,
when the non-pneumatic tire is mounted on a vehicle and travels on a flat ground plane, a gap is secured between the connecting member positioned between the ground plane and the inner cylinder and the other connecting members adjacent to the connecting member in the tire circumferential direction, each of the plurality of connecting members includes
a vertical base portion that extends toward the inside in the tire radial direction from the inner peripheral surface of the outer cylinder,
a horizontal base portion that extends along the tire circumferential direction from an inner end portion in the tire radial direction of the vertical base portion toward one side in the tire circumferential direction, and
an inclined portion that gradually extends toward one side in the tire circumferential direction from an end portion on one side in the tire circumferential direction of the horizontal base portion toward the inside in the tire radial direction, and
when the outer cylinder is pushed by a protrusion, and at least a part of the plurality of connecting members positioned between the protrusion and the inner cylinder and the other of the plurality of connecting members adjacent to the part of the plurality of connecting members in the tire circumferential direction abut each other,
among each of the connecting members abutting each other, a connection part between the vertical base portion and the horizontal base portion of each of the connecting members abutting each other positioned on one side in the tire circumferential direction and an outer part of the inclined portion in the tire radial direction of each of the connecting members abutting each other positioned on the other side in the tire circumferential direction abut each other.

2. The non-pneumatic tire according to claim 1, wherein
a thickness of the inclined portion is thinner than a thicknesses of each of the vertical base portion and the horizontal base portion, and
in the outer part of the inclined portion in the tire radial direction, at least a part that abuts the connection part of the other connecting member of each of the connecting members abutting each other is positioned outside in the tire radial direction from a center portion in the tire radial direction between the inner cylinder and the outer cylinder when the outer cylinder is deformed toward the inside in the tire radial direction such that the inner peripheral surface of the outer cylinder bulges toward the inside in the tire radial direction.

* * * * *